(12) United States Patent
Motono et al.

(10) Patent No.: US 8,689,390 B2
(45) Date of Patent: Apr. 8, 2014

(54) WIPER DEVICE

(75) Inventors: Akihisa Motono, Kosai (JP); Shingo Ohno, Hamamatsu (JP); Shunsaku Ohta, Kosai (JP); Yoshiyuki Kuomo, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 0 days.

(21) Appl. No.: 13/574,182

(22) PCT Filed: Feb. 22, 2011

(86) PCT No.: PCT/JP2011/053770
§ 371 (c)(1),
(2), (4) Date: Jul. 19, 2012

(87) PCT Pub. No.: WO2011/108393
PCT Pub. Date: Sep. 9, 2011

(65) Prior Publication Data
US 2012/0297566 A1 Nov. 29, 2012

(30) Foreign Application Priority Data
Mar. 4, 2010 (JP) .................. 2010-048426

(51) Int. Cl.
*B60S 1/18* (2006.01)
*B60S 1/24* (2006.01)
*B60S 1/06* (2006.01)

(52) U.S. Cl.
USPC ....... 15/250.31; 15/250.3; 384/295; 384/296; 384/297

(58) Field of Classification Search
USPC ............ 15/250.3, 250.31, 250.27; 296/96.15, 296/96.17; 384/295, 296, 297
See application file for complete search history.

(56) References Cited

U.S. PATENT DOCUMENTS

| 5,601,379 A | 2/1997 | Princet |
| 2002/0069474 A1* | 6/2002 | Burkard et al. ............. 15/250.3 |

(Continued)

FOREIGN PATENT DOCUMENTS

| EP | 0852195 A1 | 7/1998 |
| JP | 09-039741 B2 | 2/1997 |

(Continued)

OTHER PUBLICATIONS

Machine tranlation of description portion of EP 0852195, published Jul. 1998.*

(Continued)

*Primary Examiner* — Gary Graham
(74) *Attorney, Agent, or Firm* — Caesar, Rivise, Bernstein, Cohen & Pokotilow, Ltd.

(57) ABSTRACT

Disclosed is a wiper device provided with a metal frame member (16), which includes a cylindrical receiving portion (26), and a pivot holder (18), which is fixed to the metal frame member (16) and holds a pivot shaft (12). The pivot holder (18) includes holder cylindrical portions (34, 104), which rotationally support the pivot shaft (12), vehicle body attachment legs (38, 108), which extend radially outward from the holder cylindrical parts (34, 104) and are attached to a vehicle body, and fitting portions (40B, 110B), which are securely fitted to the receiving part (26) by inserting the fitting portions (40B, 110B) in the receiving portion (26) and swaging the receiving portion (26). The pivot holder (18) is formed as an integrated component by a metal part and a plastic part (32), which is lighter than the metal part and is integrated with the metal part. At least an outer circumferential portion of the engaged parts (40B, 110B) is formed by the metal part.

12 Claims, 14 Drawing Sheets

(56) References Cited

U.S. PATENT DOCUMENTS

| | | |
|---|---|---|
| 2002/0162184 A1 | 11/2002 | Shido |
| 2005/0097700 A1 | 5/2005 | Iwata |
| 2008/0235895 A1* | 10/2008 | Tajima .................. 15/250.31 |

FOREIGN PATENT DOCUMENTS

| | | | |
|---|---|---|---|
| JP | 2002-178880 A | | 6/2002 |
| JP | 2002-308061 | * | 10/2002 |
| JP | 2003-019948 A | | 1/2003 |
| JP | 2005-145093 B2 | | 6/2005 |
| WO | 0179045 A1 | | 10/2001 |

OTHER PUBLICATIONS

Solids and Metal-Specific Gravities, www.engineeringtoolbox.com/specific-gravity-solids-metals-d_293.html, Jul. 15, 2013.*

International Search Report for PCT/JP2011/053770.

* cited by examiner

WIPER DEVICE

FIELD OF THE DISCLOSURE

The present invention relates to a wiper device.

BACKGROUND OF THE DISCLOSURE

Conventionally, a wiper device is known in which a metal frame pipe serving as a frame member is swaged in a state where a coupling portion, which projects from a pivot holder, is inserted in the metal frame pipe, to couple the pivot holder to the metal frame pipe (see, for example, Patent Documents 1 and 2). The pivot holders described in those documents are formed by performing die-casting on aluminum.

Further, to meet the recent demands for weight reduction in a vehicle body, a plastic pivot holder has been proposed (see, for example, Patent Document 3). The plastic pivot holder described in this document is formed integrally with an elongated metal frame pipe on an end portion of the frame pipe so that the pivot holder can be coupled to the metal frame pipe. To form the plastic pivot holder integrally with the metal frame pipe, it is necessary to set the metal frame pipe in a metal mold beforehand.

PRIOR ART DOCUMENT

Patent Document

Patent Document 1: International Publication No. WO 01/79045
Patent Document 2: Japanese Patent No. 4146329
Patent Document 3: Japanese Patent No. 3484587

SUMMARY OF THE INVENTION

Problems that the Invention is to Solve

However, it takes an extra time to perform a process of setting the elongated metal frame pipe in the metal mold beforehand as described in Patent Document 3. Further, the process increases costs because the metal mold requires large scale facilities.

It may be considered to change the material of the pivot holder, which is coupled to the metal frame pipe by swaging the pipe, from metal as described in Patent Documents 1 and 2 to plastic.

However, if the pivot holder is made of plastic, the coupling portion projecting from the pivot holder is also made of plastic. Thus, there is a possibility that the pivot, holder's coupling portion may be deformed or cracked when the metal frame pipe is swaged. That is, it is difficult to obtain a desired strength in coupling and fixing the metal frame pipe and the pivot holder to each other.

Further, if force due to vibrations of a wiper motor or operation of a wiper blade is repeatedly applied to a swaged coupling portion between the plastic pivot holder's coupling portion and the metal frame pipe, the swaged coupling portion may wear, which cause the swaged coupling portion to chatter. That is, there is a possibility that the strength of coupling/fixing between the pivot holder and the metal frame pipe may decrease easily.

It is an objective of the present invention to provide a wiper device in which the strength of coupling/fixing between a pivot holder and a frame member is easily ensured while reducing the weight of the device.

Means for Solving the Problems

To achieve the foregoing objective and in accordance with one aspect of the present invention, a wiper device is provided that includes a metallic frame member that has a tubular receiving portion and a pivot holder that is fixed to the frame member and holds a pivot shaft. The pivot holder includes a holder tube portion that rotationally supports the pivot shaft, a vehicle body attachment leg that extends radially outward from the holder tube portion and is attached to a vehicle body, and a fitting portion that is fitted and fixed to the receiving portion by swaging the receiving portion in a state where the fitting portion is inserted to an inside of the receiving portion. The pivot holder is provided as an integral component formed by a metal part and a plastic part. The plastic part has a smaller specific gravity than the metal part and is integrally molded with the metal part. At least an outer circumferential portion of the fitting portion is formed by the metal part.

DETAILED DESCRIPTION OF THE PREFERRED EMBODIMENTS

Figure 1:
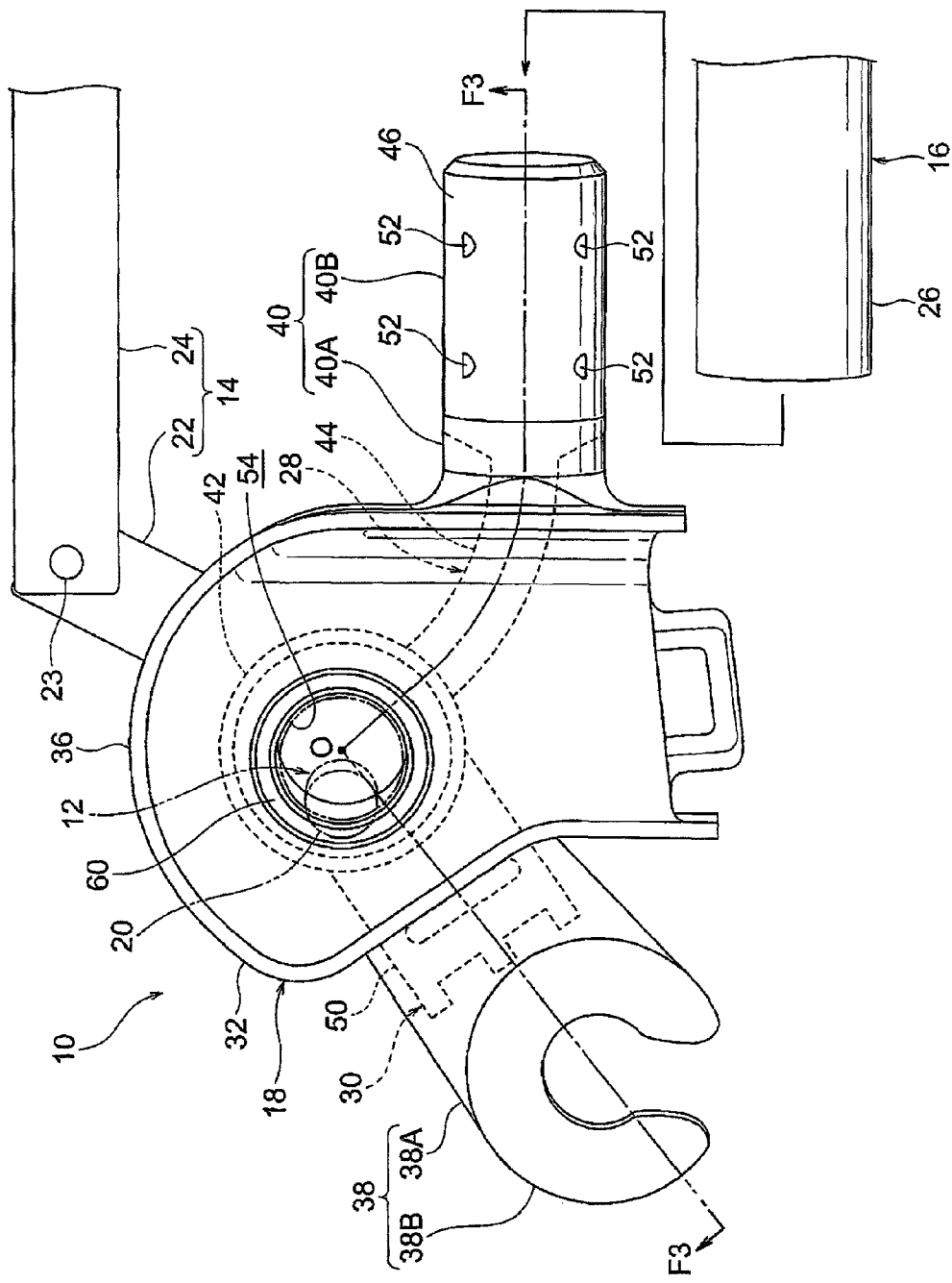
FIG. 1 is a plan view of a periphery of a pivot holder of a wiper device according to a first embodiment of the present invention.

In the following embodiments, a wiper device has a pair of pivot holders which are generally symmetrical bilaterally. Therefore, only the pivot holder on the right side of a vehicle will be described mainly, and repetitive description on the left-side pivot holder will be omitted.

FIGS. 1 to 4 show a wiper device 10 according to a first embodiment of the present invention. The wiper device 10 is configured to swing a pair of right and left wiper arms, which wipe a windshield of a vehicle such as a passenger automobile. A part of the wiper device 10 on the left side of the vehicle includes a pivot holder 18 fixed to a vehicle body (not shown), a pivot shaft 12 rotationally supported by the pivot holder 18 and secured to the vehicle body, a link mechanism 14, which swings the pivot shaft 12 by transmitting power from a wiper motor (not shown) to the proximal end of the pivot shaft 12, and a frame pipe 16 serving as a metal frame member that couples the pair of right and left pivot shafts 12. The wiper motor is attached to, for example, the frame pipe 16.

Figure 3:
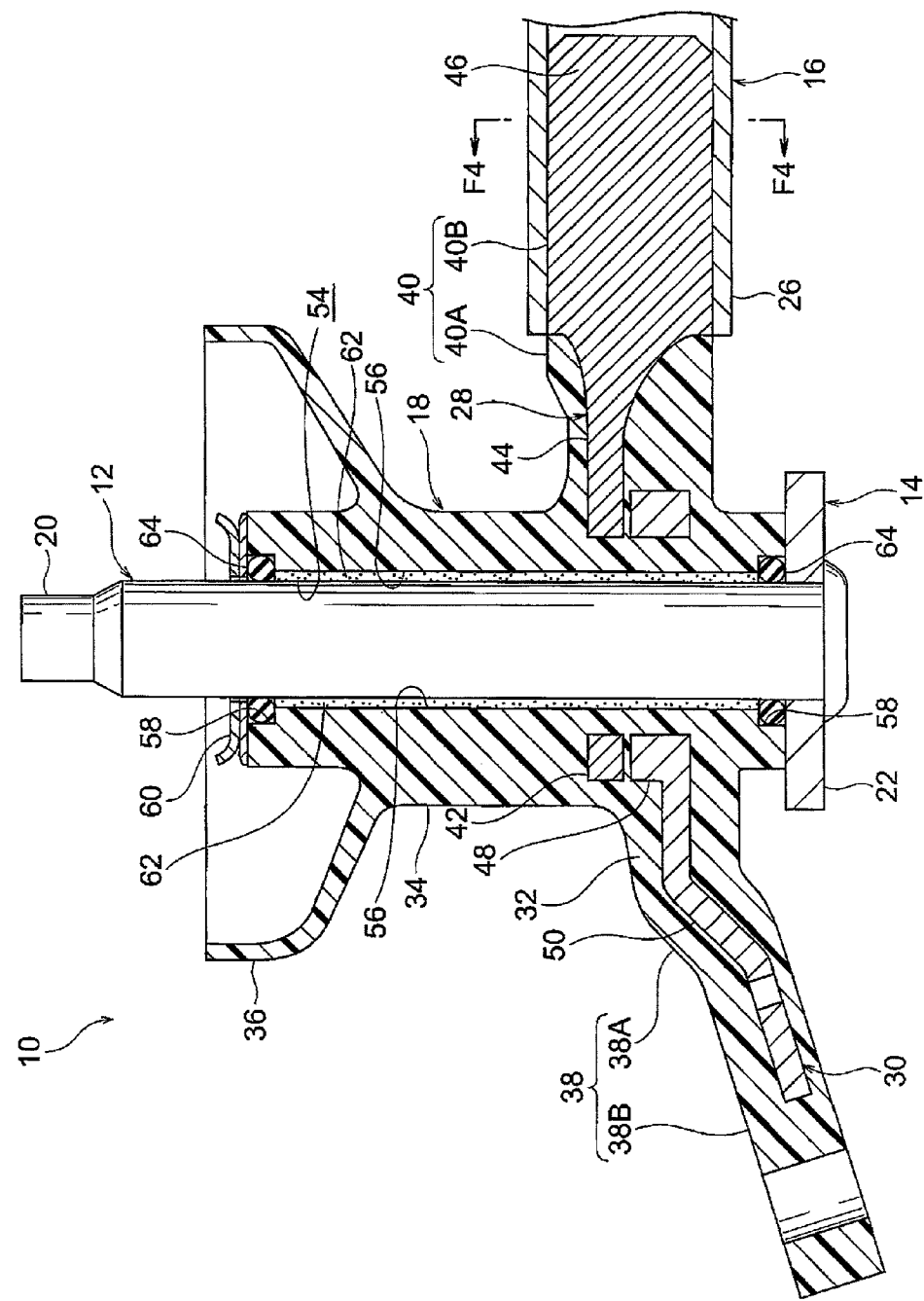
FIG. 3 is a cross-sectional view taken along line F3-O-F3 of FIG. 1.

As shown in FIG. 3, a thread is formed in the distal end of the round rod-shaped pivot shaft 12, thereby forming an arm attachment portion 20 serving as a fixing portion, to which the proximal end of the wiper arm (not shown) is fastened, and fixed integrally rotationally. Therefore, when the wiper motor is driven, the wiper arm reciprocates via the link mechanism 14 and the pivot shaft 12, thereby wiping the windshield.

Figure 10:
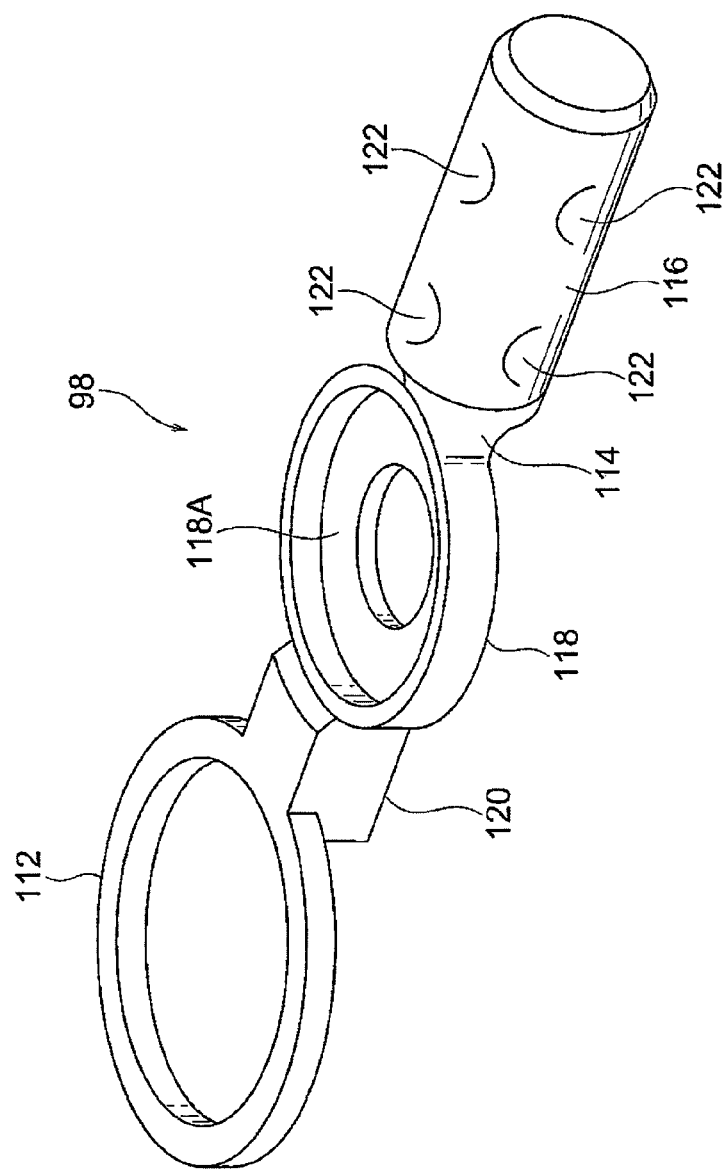
FIG. 10 is a perspective view of a metal component in FIG. 9.

As shown in FIG. 1, the link mechanism 14 has a link rod 24, to which power is transmitted from the wiper motor (not shown), and a pivot lever 22, which is rotationally coupled to the link rod 24 via a swing shaft 23 formed by a ball pin, which constitutes a ball joint. As shown in FIG. 3, the end portion of the pivot lever 22 is fixed to the proximal end of the pivot shaft 12 integrally rotationally. As shown in FIG. 10, a swing shaft 23 extends from the pivot lever 22.

The elongated frame pipe 16 is formed of a plastically deformable metal material such as carbon steel. That is, the end portion of the frame pipe 16 constitutes a tubular receiving portion 26, which is coupled to the pivot holder 18.

As shown in FIG. 3, the pivot holder 18 is configured as an integral component by having a first metal component 28, a second metal component 30, and a plastic part 32, which is formed integrally with the first metal component 28 and the second metal component 30. That is, in the present embodiment, a metal part of the pivot holder 18 is formed by the first metal component 28 and the second metal component 30. In terms of functions, the pivot holder 18 has a holder tube portion 34, which pivotably supports the pivot shaft 12, and a water receiving portion 36, which receives water such as rain water running down from the wiper arm to the pivot shaft 12 to prevent it from entering the vehicle. The holder tube portion 34 and the water receiving portion 36 are formed by a plastic part 32. Further, the pivot holder 18 has a vehicle body attachment leg 38, which attaches the pivot holder 18 to the vehicle body, and a fitting arm 40, which is coupled to the frame pipe 16. In the present embodiment, the vehicle body attachment leg 38 is formed by the second metal component 30 and the plastic part 32. The fitting arm 40 is formed by the first metal component 28 and the plastic part 32.

As shown in FIG. 3, the water receiving portion 36 spreads from the holder tube portion 34 to the periphery to be shaped like a recess that opens toward the distal end of the pivot shaft 12.

The vehicle body attachment leg 38 serving as a leg portion that attaches the pivot holder 18 has a leg body 38A, which extends radially outward from the holder tube portion 34 (to the front and outside of the vehicle, leftward in FIG. 3), and a C-shaped vehicle body attachment portion 38B, which is formed on the distal end of the leg body 38A in such a manner that it may have an attachment hole to be attached to the vehicle body via a bolt and the like.

The fitting arm 40 serving as a fitting arm portion of the pivot holder 18 has an arm body 40A, which extends from the holder tube portion 34 to the opposite side of the vehicle body attachment leg 38 (toward the inside of the vehicle, rightward in FIG. 3), and a fitting portion 40B, which is formed on the distal end of the arm body 40A. The fitting portion 40B is fit and fixed to the receiving portion 26 by swaging the receiving portion 26 in a state where the fitting portion 40B is inserted in the receiving portion 26 of the frame pipe 16. That is, the fitting portion 40B functions as a coupling portion which is inserted into the metal frame pipe 16 so that it may be coupled to the frame pipe 16.

Next, a description will be given in detail of the first metal component 28 and the second metal component 30 of the pivot holder 18.

As shown in FIG. 3, the first metal component 28 is a die-cast component made of metal such as aluminum alloy, for example, and the second metal component 30 is a pressed component formed by pressing a steel plate. The first metal component 28 integrally has a first annular portion 42, through which the pivot shaft 12 is inserted, an arm framework portion 44, which constitutes the framework of the arm body 40A, and a fitting portion forming portion 46, which provides the fitting portion 40B. The second metal component 30 integrally has a second annular portion 48, through which the pivot shaft 12 is inserted, and a leg framework portion 50 serving as an attachment leg forming portion, which provides the framework of the leg body 38A. That is, in the present embodiment, the first annular portion 42 and the second annular portion 48 are separate from each other.

Figure 2:
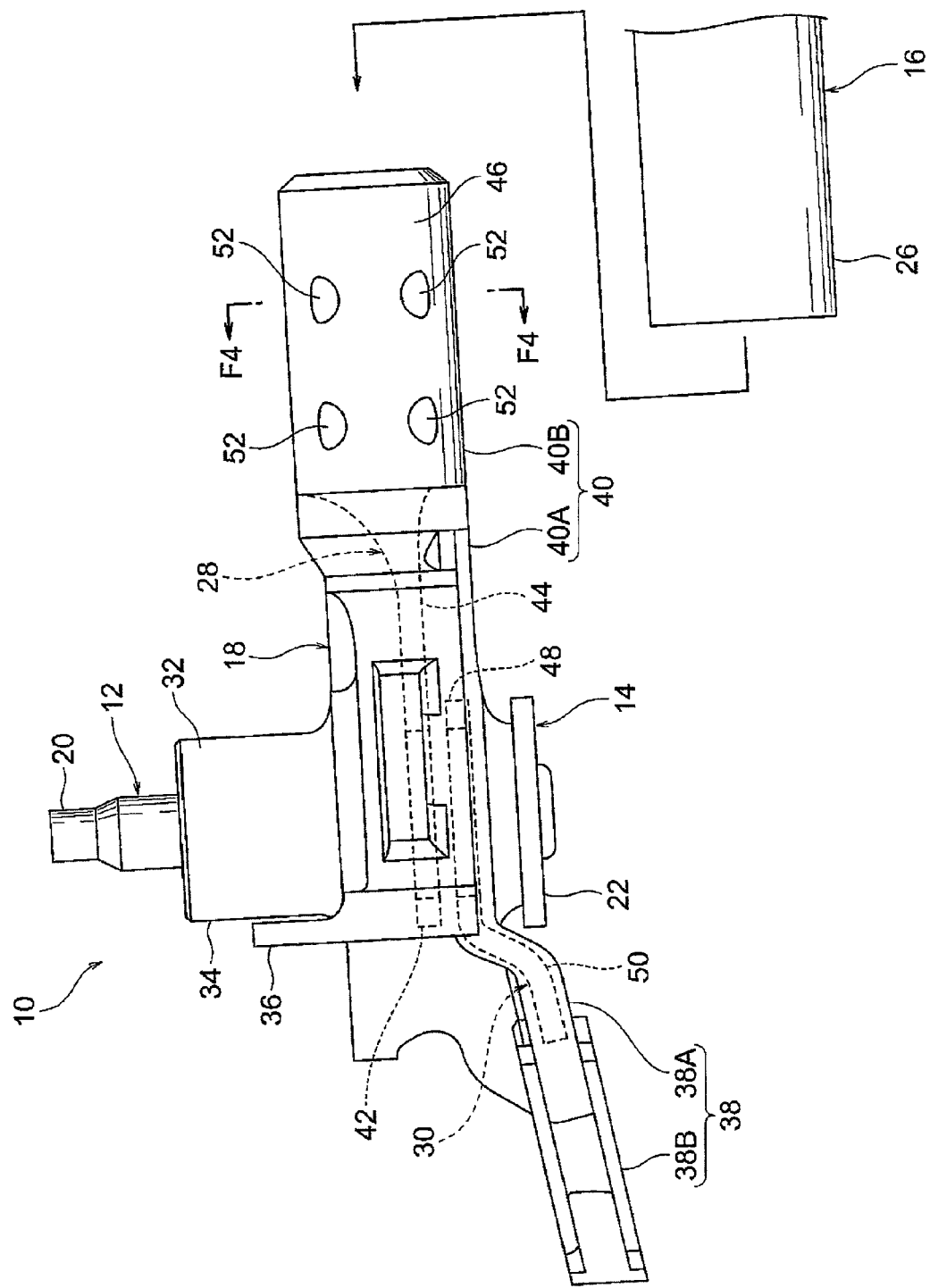
FIG. 2 is a front view of the pivot holder in FIG. 1.

The first annular portion 42 is formed to have an inner diameter that is larger than the diameter of the pivot shaft 12. The arm framework portion 44 extends radially outward from the first annular portion 42 to couple the first annular portion 42 and the fitting portion forming portion 46 to each other. The fitting portion forming portion 46 is formed to have a solid core and has a plurality of recesses, that is, close contact recesses 52 formed in its surface as shown in FIG. 2. That is, at least the outer circumferential portion of the fitting portion 40B is formed by the first metal component 28. In other words, the arm framework portion 44 and the outer circumferential portion of the fitting portion forming portion 46 are combined to form a metallic outer circumferential portion forming portion that extends from the first annular portion 42 to form the outer circumferential portion of the fitting portion 40B. The inner circumferential portion, that is, the core portion inward from the outer circumferential portion of the fitting portion 40B of the present embodiment is formed as a metallic solid core body which is integrated with the outer circumferential portion of the fitting portion 40B by performing aluminum die-casting on the first metal component 28. That is, a close contact recess 52 is formed in the metallic outer circumferential portion forming portion.

Like the first annular portion 42, the second annular portion 48 is formed to have an inner diameter that is larger than the diameter of the pivot shaft 12 as shown in FIG. 3. The leg framework portion 50 is formed like a tongue strip which extends radially outward from the second annular portion 48.

In such a manner, the first metal component 28 and the second metal component 30 are integrated with the plastic part 32 by being formed integrally with the plastic in a state where they are set in a molding machine as insertion components beforehand, that is, insert molding is performed. The plastic part 32 is formed of a plastic material having a smaller specific gravity than the metal of the first metal component 28 and the second metal component 30.

As shown in FIG. 3, the first annular portion 42 and the second annular portion 48 are embedded in the plastic part 32 of the holder tube portion 34.

The arm body 40A of the arm framework portion 44 is embedded in the plastic part 32 to thereby form the internal framework of the arm body 40A. The fitting portion forming portion 46 is exposed from the plastic part 32 to thereby form the fitting portion 40B. That is, the fitting portion forming portion 46 of the first metal component 28 provides not only the outer circumferential portion of the fitting portion 40B but also the entirety of the fitting portion 40B including the inner circumferential portion of the fitting portion 40B.

The leg framework portion 50 is embedded in the plastic part 32 at the leg body 38A to thereby form the internal framework of the leg body 38A. The vehicle body attachment portion 38B positioned to the distal end of the leg body 38A is formed by the plastic part 32.

As shown in FIG. 3, the axial portion of the holder tube portion 34 has an insertion hole 54 which extends axially so that the pivot shaft 12 may be inserted through it. In the inner circumferential surface of the insertion hole 54, a plurality of axially extending grease grooves 56 is formed with spacing given between them circumferentially. Moreover, at each of the two axial ends of the insertion hole 54, an annular housing groove 58 is formed.

The distal end of the pivot shaft 12 is inserted into the insertion hole 54 in a state where the pivot lever 22 is fixed to the proximal end of the pivot shaft 12 integrally rotationally. By fitting a teeth washer 60 to the distal end of the pivot shaft 12 in a state where it is inserted through the insertion hole 54, the pivot shaft 12 is limited from axially moving with respect to the holder tube portion 34, while being held rotationally by the holder tube portion 34.

As shown in FIG. 3, the insertion hole 54 is formed by using the plastic part 32, inside of the first annular portion 42 and the second annular portion 48. That is, the pivot shaft 12 passes through the insertion hole 54 to thereby pass through the inside of the first annular portion 42 and the second annular portion 48. The grease grooves 56 each keep grease 62. Each of the housing grooves 58 contains an O-ring 64, which prevents water and dust from entering the insertion hole 54 and also prevents the grease 62 from flowing out of the insertion hole 54.

A description will be given of, in particular, the process of coupling the pivot holder 18 to the frame pipe 16 in the method for manufacturing the wiper device 10.

Figure 4:
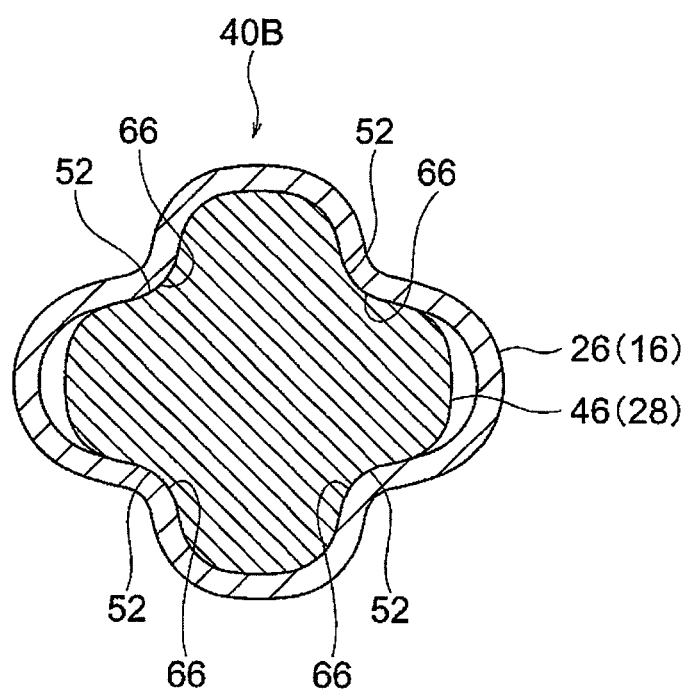
FIG. 4 is a cross-sectional view taken along line F4-F4 of FIG. 3.

The fitting portion 40B formed by the metallic fitting portion forming portion 46 is inserted to the inside of the receiving portion 26 of the frame pipe 16. In this condition where it is inserted, portions of the receiving portion 26 that face the plurality of close contact recesses 52 are swaged inward by a swaging tool and the like. As a result, as shown in FIG. 4, the receiving portion 26 is plastically deformed at several positions to have a plurality of inward projecting protrusions 66 formed there. The plurality of protrusions 66 is fit to the plurality of close contact recesses 52 respectively in a close contact manner. By such swaging and fixing, the pivot holder 18 is coupled to the frame pipe 16 as shown in FIG. 3. That is, the close contact recesses 52 formed in the fitting portion 40B provide a close contact portion that has a close contact surface, with which the protrusions 66 come in contact.

The first embodiment has the following advantages.

(1) The wiper device 10 has such a configuration that the frame pipe 16 and the pivot holder 18 are coupled to each other by swaging. Accordingly, the pivot holder 18 can be formed separately from the frame pipe 16. Therefore, as compared to the case of, for example, forming the pivot holder 18 integrally with the elongated frame pipe 16, the wiper device 10 of the present embodiment takes short time in process for manufacture and does not need large scale facilities. It is thus possible to reduce the costs.

Moreover, the pivot holder 18 is configured as an integral component obtained by forming the first metal component 28 and the second metal component 30 integrally with the plastic part 32, which has a smaller specific gravity than the metal components. Therefore, the pivot holder 18 of the present embodiment can be made lighter even than a case where the entirety of the pivot holder 18 is made of metal, for example, aluminum alloy.

(2) The entirety of the fitting portion 40B of the pivot holder 18 including the outer circumferential portion of the fitting portion 40B is formed by the first metal component 28. The outer circumferential portion of the fitting portion 40B is fixed to the receiving portion 26 of the frame pipe 16 by swaging. Accordingly, the frame pipe 16 and the pivot holder 18 can be coupled to each other by fixing their own metal parts to each other through swaging. Therefore, it is easy to ensure the strength of coupling/fixing between the pivot holder 18 and the frame pipe 16.

Further, the fitting portion 40B is formed by the first metal component 28, which is a die-cast component made of metal such as aluminum alloy. Therefore, it is possible to fix the receiving portion 26 to the fitting portion 40B of the pivot holder 18 by swaging even in the present embodiment by utilizing the same swaging tool as that used to swage the receiving portion in such a conventional case that, for example, the entirety of the pivot holder may be a die-cast component made of metal such as aluminum alloy.

(3) The first metal component 28 and the second metal component 30 are configured to be separate from each other before they are integrated with each other with the plastic part 32. Accordingly, the angular position of the second metal component 30 around the axis of the pivot shaft 12 can be arbitrarily set easily with respect to the first metal component 28. Therefore, for example, even in the case of manufacturing the pivot holder 18 that has the different direction in which the vehicle body attachment leg 38 extends with respect to the fitting portion 40B with the different car type, the pivot holders 18 can share in use at least one of the first metal component 28 and the second metal component 30. In particular, the first metal component 28 coupled to the frame pipe 16 can be used also in a car type in which the second metal component 30 may have an arbitrary angular position. It, therefore, enables reducing the costs further. Moreover, since the first metal component 28 and the second metal component 30 are configured to be separate from each other before they are integrated with each other with the plastic part 32, they can be made of the different metal materials, so that the materials can be selected that match the necessary strength and processes.

(4) The internal framework of the leg body 38A of the pivot holder 18 is formed by the metallic leg framework portion 50, and the vehicle body attachment portion 38B positioned to the distal end of the leg body 38A is formed by the plastic part 32. Accordingly, as compared to a case where, for example, the entirety of the vehicle body attachment leg 38 is made of metal, the present embodiment can reduce the weight of the vehicle body attachment leg 38 while ensuring the strength of the vehicle body attachment leg 38.

(5) If force of impact axially acts on the holder tube portion 34 via the pivot shaft 12 in a state where the wiper device 10 is fixed to the vehicle body, the vehicle body attachment leg 38 is liable to be broken at a boundary between the plastic vehicle body attachment portion 38B and the metallic leg framework portion 50, which is the internal framework of the vehicle body attachment leg 38. Accordingly, the pivot holder 18 absorbs the shock easily.

FIGS. 5 to 8 show a wiper device 70 according to a second embodiment of the present invention. The wiper device 70 is different from the wiper device 10 according to the first embodiment in that the pivot holder 18 is changed as follows.

Figure 7:
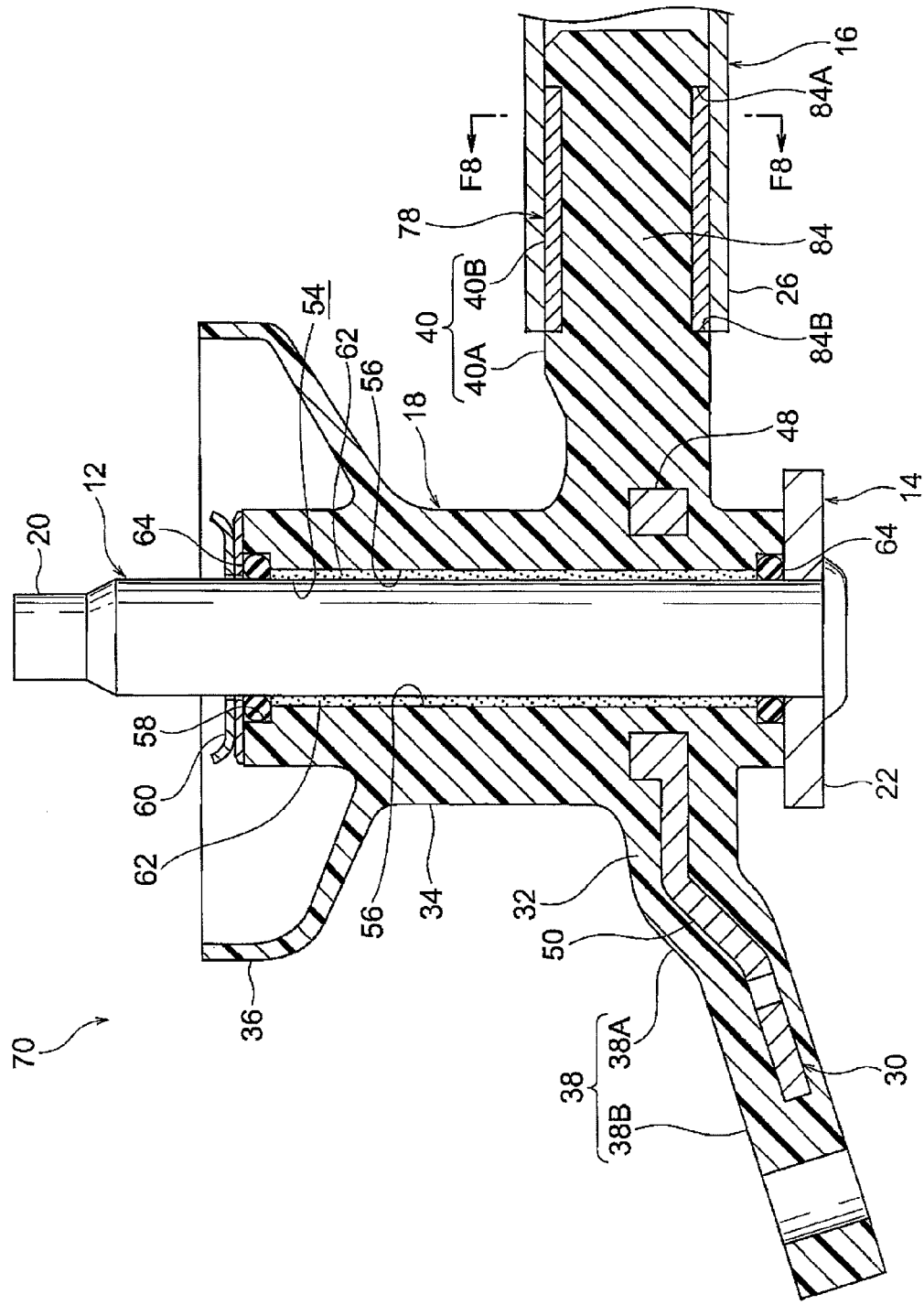
FIG. 7 is a cross-sectional view taken along line F7-O-F7 of FIG. 5.

As shown in FIG. 7, a pivot holder 18 of the second embodiment replaces the first metal component 28 with a first metal component 78, which forms only the outer circumference portion of a fitting portion 40B. The first metal component 78 is made of metal such as carbon steel to be hollow in shape.

Figure 5:
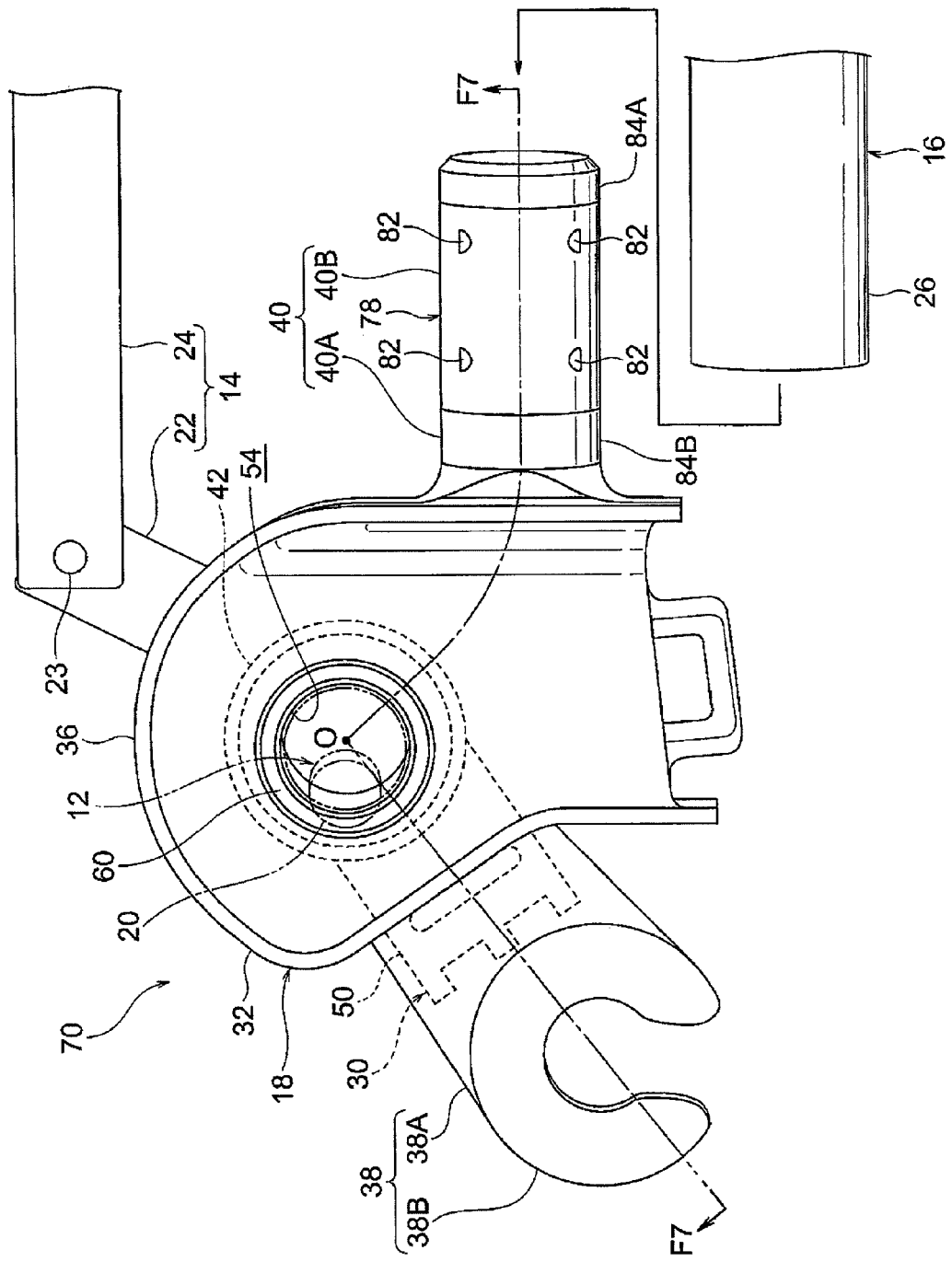
FIG. 5 is a plan view of a periphery of a pivot holder according to a second embodiment of the present invention.
Figure 6:
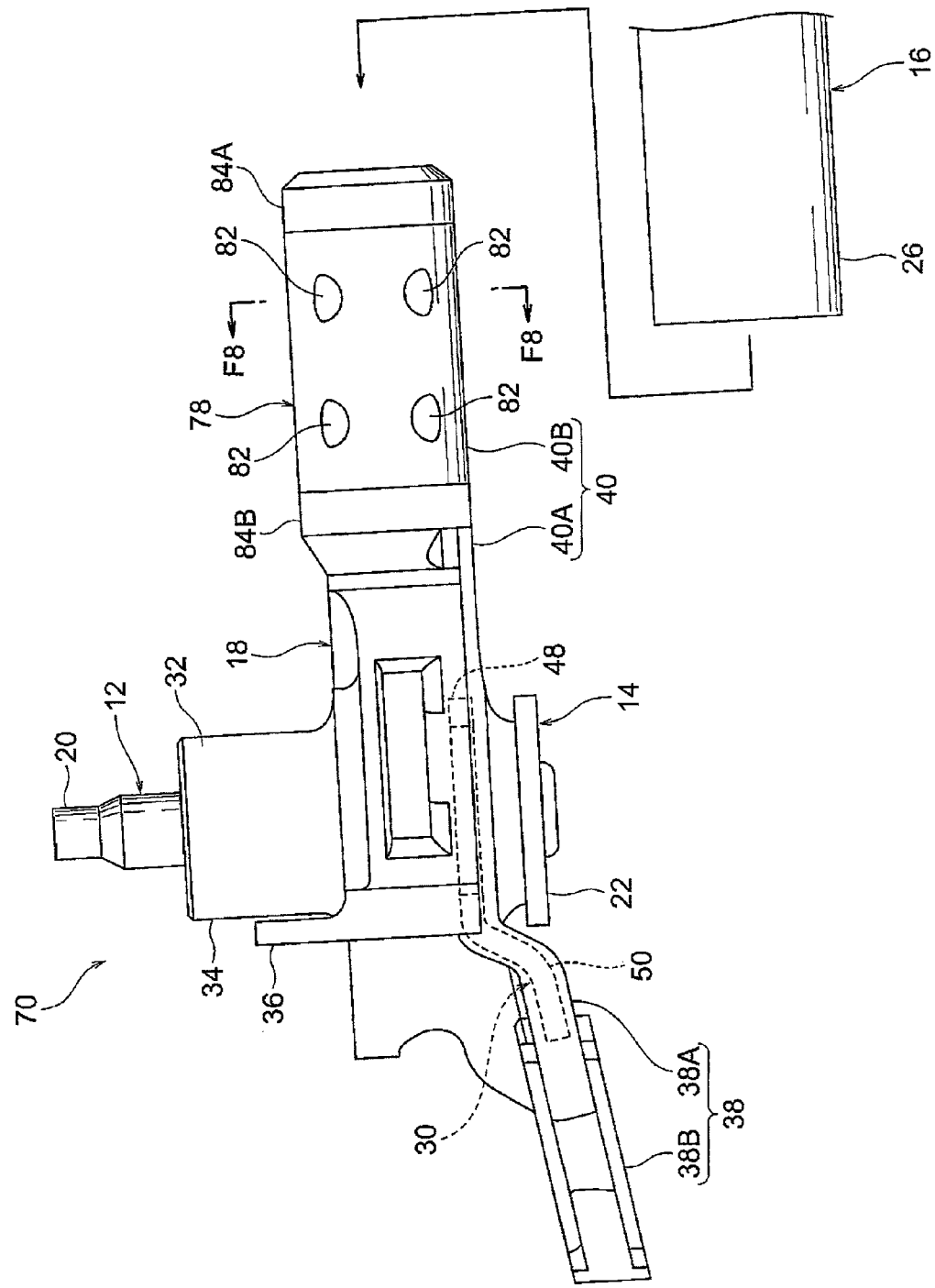
FIG. 6 is a front view of the pivot holder in FIG. 5.
Figure 8:
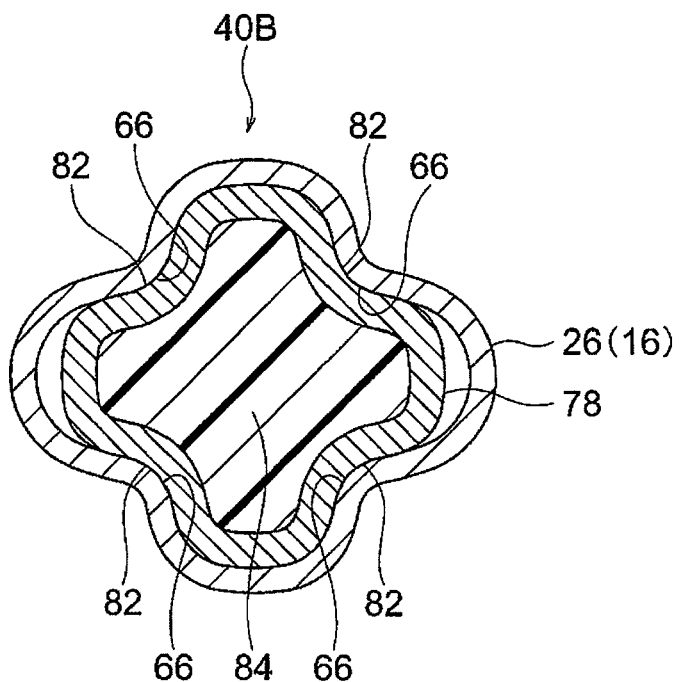
FIG. 8 is a cross-sectional view taken along line F8-F8 of FIG. 7.
Figure 9:
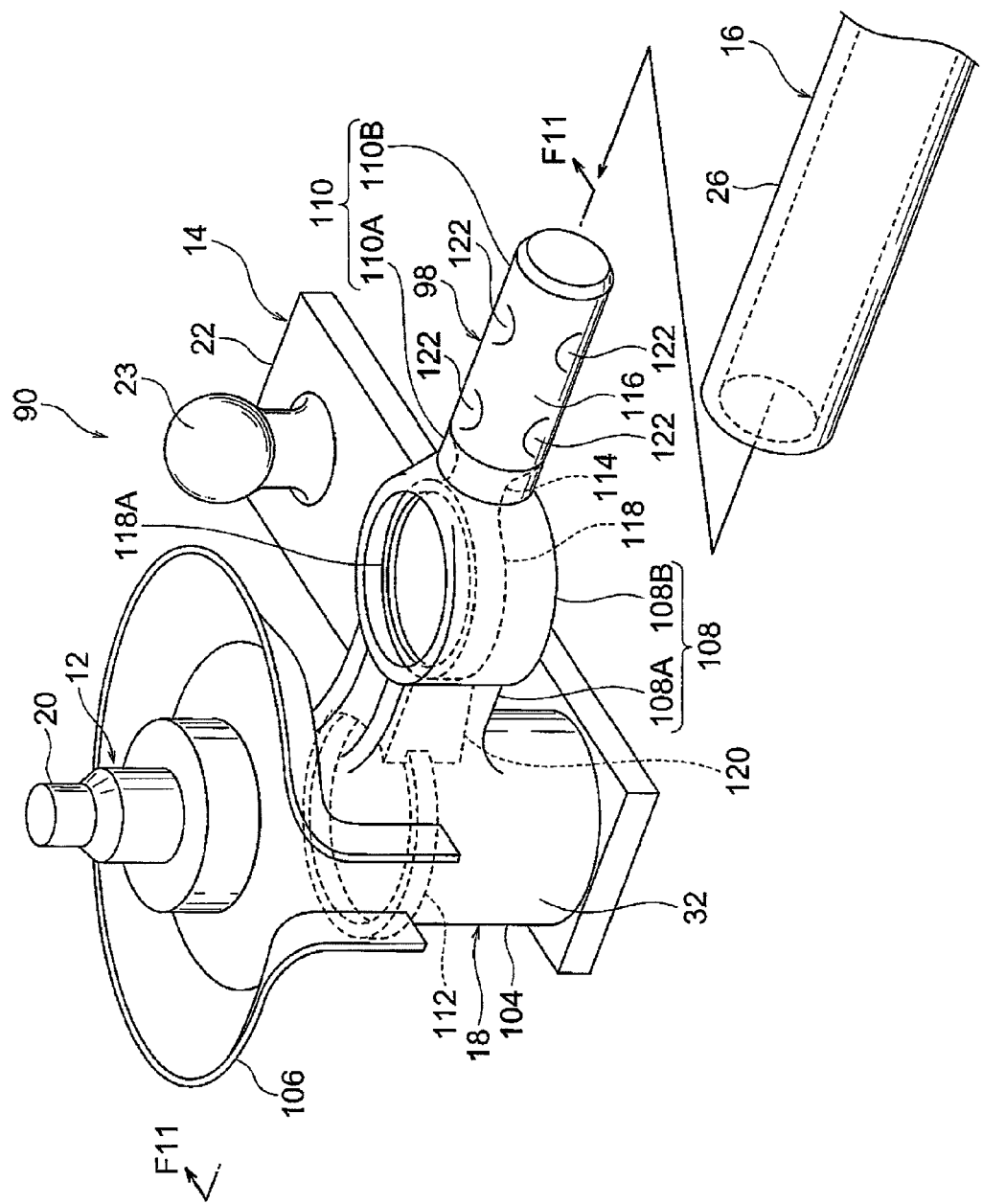
FIG. 9 is an exploded perspective view of a periphery of a pivot holder according to a third embodiment of the present invention.

That is, the first metal component 78 in FIG. 7 is shaped like a tube to be a component for outsert molding. As shown in FIGS. 5 and 6, in the surface of the first metal component 78, a plurality of close contact recesses 82 is formed. That is, the first metal component 78 is an outer circumferential portion forming portion that forms the outer circumferential portion of the fitting portion 40B, while the inner circumferential portion of the fitting portion 40B is formed by using a plastic part 32 in the present embodiment as shown in FIGS. 7 and 8. In such a manner, the close contact recesses 82 are formed in the metallic outer circumferential portion forming portion.

As shown in FIG. 7, the plastic part 32 has a support portion 84, which supports the first metal component 78 from the inside of the first metal component 78. The plastic part 32 has a first stopper 84A and a second stopper 84B at the two axial ends of the first metal component 78. The stoppers 84A, 84B are configured to limit axial movements of the first metal component 78. The first stopper 84A is positioned between a holder tube portion 34 and the first metal component 78.

A process for coupling the pivot holder 18 of the second embodiment to a frame pipe 16 will be described as follows. The portions of a receiving portion 26 of a frame pipe 16 that face the plurality of close contact recesses 82 are swaged in a state where the fitting portion 40B is inserted to the inside of the receiving portion 26. Accordingly, as shown in FIG. 8, the receiving portion 26 has a plurality of protrusions 66 formed on it which are plastically deformed inward. By fixing the protrusions 66 tightly to the surface of the plurality of close contact recesses 82 through swaging, the pivot holder 18 is coupled to the frame pipe 16.

The second embodiment has the following advantages.

(6) Similar to the first embodiment, in the second embodiment also, the frame pipe 16 and the pivot holder 18 are coupled to each other by swaging. Therefore, it is possible to reduce the costs.

(7) The pivot holder 18 is configured as an integral component obtained by forming the first metal component 78 and the second metal component 30 integrally with the plastic part 32, which has a smaller specific gravity than the metal components. Therefore, the pivot holder 18 can be made light.

(8) The outer circumferential portion of the fitting portion 40B of the pivot holder 18 is formed by the first metal component 78 and fixed to the receiving portion 26 of the frame pipe 16 by swaging. Therefore, it is easy to ensure the strength of coupling/fixing between the pivot holder 18 and the frame pipe 16.

(9) The first metal component 78 and the second metal component 30 are configured to be separate from each other before they are integrated with each other with the plastic part 32. Accordingly, the angular position of the second metal component 30 around the axis of the pivot shaft 12 can be arbitrarily set easily with respect to the first metal component 78. Therefore, for example, even in the case of manufacturing the pivot holder 18 that has the different direction in which the vehicle body attachment leg 38 extends with respect to the fitting portion 40B with the different car type, the pivot holders 18 can share in use at least one of the first metal component 78 and the second metal component 30. In particular, the first metal component 78 coupled to the frame pipe 16 can be used also in a car type in which the second metal component 30 has an arbitrary angular position. It, therefore, enables reducing the costs further.

(10) The outer circumferential portion of the fitting portion 40B is formed by the tubular first metal component 78. That is, a portion of the fitting portion 40B that is inside the outer circumferential portion, that is, the support portion 84 and a peripheral portion of the fitting portion 40B, that is, the first and second stoppers 84a and 84B are formed with the plastic part 32. Therefore, it is possible to make the fitting portion 40B of the present embodiment lighter than a case where, for example, the entirety of the fitting portion 408 is made of metal.

FIGS. 9 to 12 show a wiper device 90 according to a third embodiment of the present invention. The wiper device 90 is different from the wiper device 10 according to the first embodiment in that the pivot holder 18 is changed as follows.

That is, the pivot holder 18 of the third embodiment is an integral component obtained by forming a plastic part 32 integrally with a metal component 98 that integrates the first metal component 28 and the second metal component 30. That is, in the present embodiment, the first annular portion and the second annular portion are integral, so that a metal part is formed by the metal component 98. Functionally, the pivot holder 18 has a holder tube portion 104, a water receiving portion 106, a vehicle body attachment leg 108, and a fitting arm 110. The plastic part 32 is almost the same as that of the first embodiment except that a vehicle body attachment portion 108B is formed by the metal component 98.

That is, the plastic holder tube portion 104 supports the pivot shaft 12 rotationally. The water receiving portion 106 is formed around the holder tube portion 104 to be shaped like a recess that opens toward the distal end of the pivot shaft 12.

The vehicle body attachment leg 108 has a leg body 108A, which extends radially outward from the holder tube portion 104 (toward the inside of the vehicle body), and a vehicle body attachment portion 108B, which is formed on the distal end of the leg body 108A so that it may be attached to the vehicle body.

The fitting arm 110 has an arm body 110A, which extends from the vehicle body attachment portion 108B to the opposite side of the holder tube portion 104 (toward the inside of the vehicle), and a fitting portion 110B, which is formed on the distal end of the arm body 110A and fixed to a receiving portion 26 of a frame pipe 16 by swaging.

Next, a description will be given in detail of the metal component 98, which forms one portion of the pivot holder 18.

As shown in FIG. 10, the metal component 98 is a die-cast component made of metal such as aluminum alloy, for example, and has an annular portion 112, a leg framework portion 120, an attachment portion forming portion 118, an arm framework portion 114, and a fitting portion forming portion 116, which are arranged linearly in that order. The leg framework portion 120 and the attachment portion forming portion 118 form an attachment leg forming portion.

Figure 11:
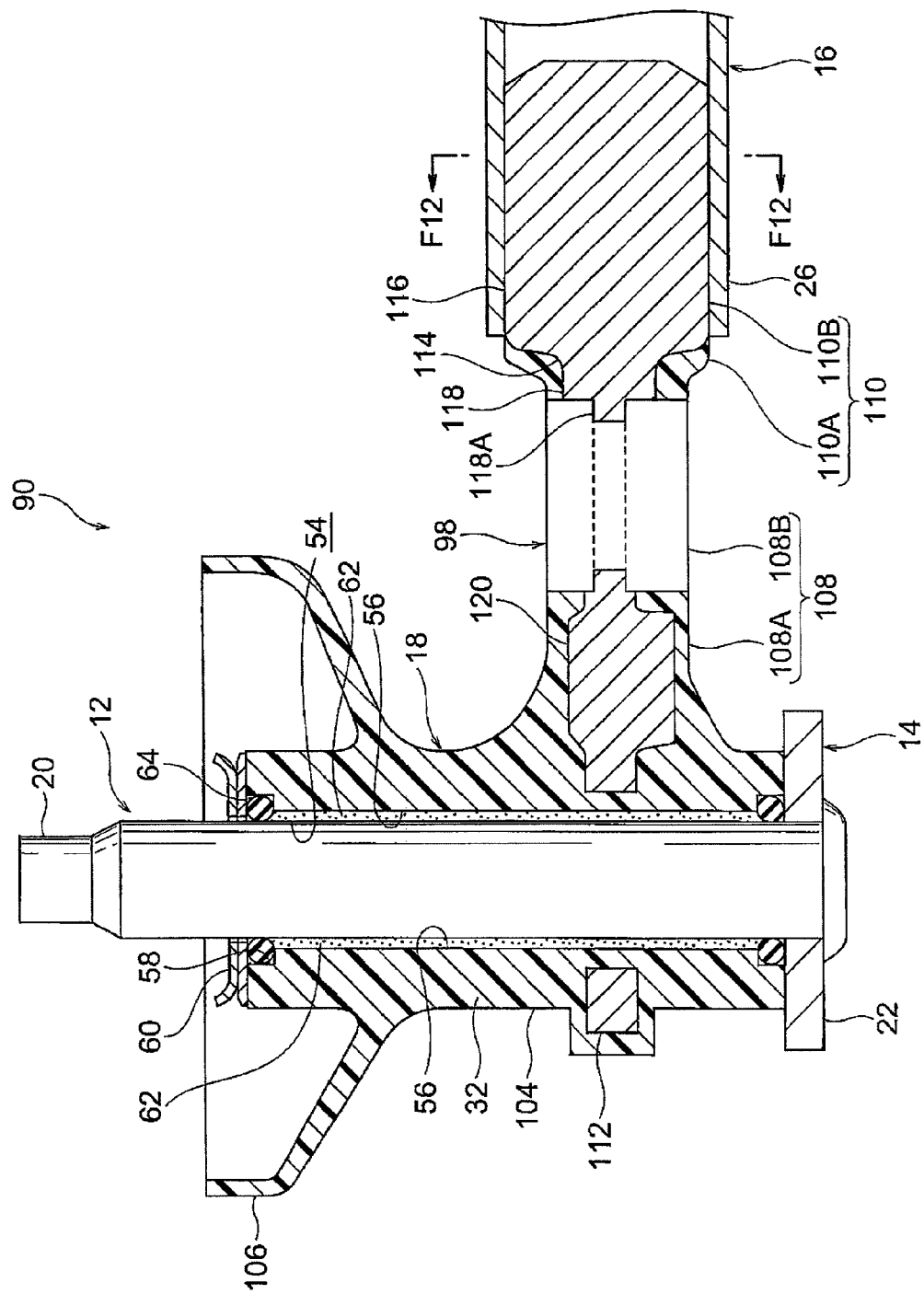
FIG. 11 is a front cross-sectional view of a pivot holder in FIG. 9.

As shown in FIG. 11, the annular portion 112 is formed to have an inner diameter that is larger than the diameter of the pivot shaft 12, and the leg framework portion 120 extends radially outward from the annular portion 112. The attachment portion forming portion 118 is formed like a ring on the distal end of the leg framework portion 120. By passing a bolt and the like through the attachment portion forming portion 118, the pivot holder 18 is attached to the vehicle body.

The arm framework portion 114 extends from the attachment portion forming portion 118 toward the opposite side of the leg framework portion 120, and the fitting portion forming portion 116 is formed like a solid core that extends from the distal end of the arm framework portion 114. The fitting portion forming portion 116 has a plurality of close contact recesses 122 formed in its surface. That is, the arm framework portion 114 and the outer circumferential portion of the fitting portion forming portion 116 are combined to form a metallic outer circumferential portion forming portion that extends from the annular portion 112 to form the outer circumferential portion of the fitting portion 110B. The inner circumferential portion of the fitting portion 110B of the present embodiment is formed as a solid core body which is integrated with the outer circumferential portion of the fitting portion 110B by performing aluminum die-casting on the metal component 98. A close contact recess 122 is formed in such a metallic outer circumferential portion forming portion.

The metal component 98 having such a configuration is integrated with the plastic part 32 by being formed integrally with the plastic in a state where it is set in a molding machine as an insertion component beforehand, that is, being insert molded.

The holder tube portion 104 and the water receiving portion 106 of the pivot holder 18 are formed by using the plastic part 32. The annular portion 112 is embedded in the plastic part 32 at the holder tube portion 104. Through the annular portion 112, the pivot shaft 12 is inserted.

The metallic leg framework portion 120 is embedded in the plastic part 32 at the leg body 108A to thereby form the internal framework of the leg body 108A. The metallic attachment portion forming portion 118 is embedded in the plastic part 32 to thereby form the internal framework of the vehicle body attachment portion 108B. A flange shaped metallic inner circumferential protrusion 118A formed on the attachment portion forming portion 118 in such a manner as to project inward is exposed from the plastic part 32 at the vehicle body attachment portion 108B.

The metallic arm framework portion 114 is embedded in the plastic part 32 at the arm body 110A to thereby form the internal framework of the arm body 110A. The metallic fitting portion forming portion 116 is exposed from the plastic part 32 to thereby form the outer circumferential portion and the inner circumferential portion of the fitting portion 110B. That is, in the present embodiment, the fitting portion forming portion 116 forms the entirety of the fitting portion 110B.

Figure 12:
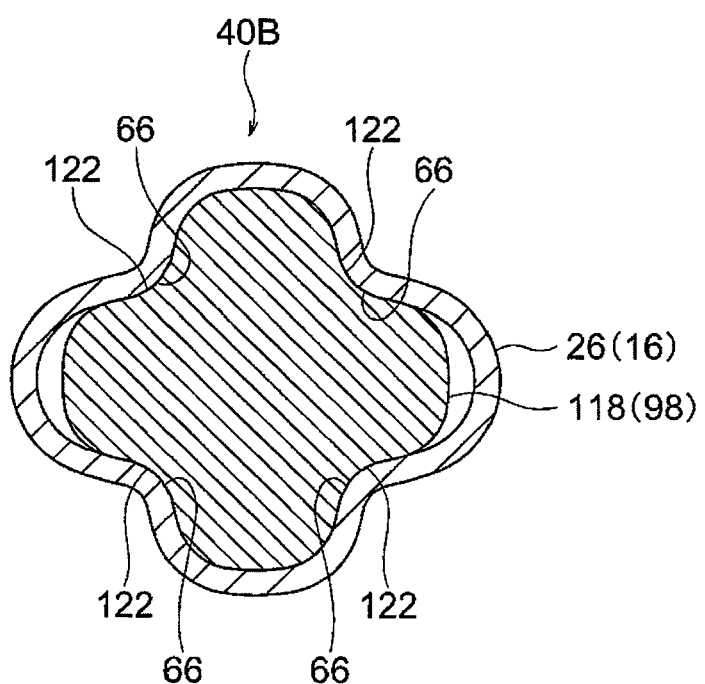
FIG. 12 is a cross-sectional view taken along line F12-F12 of FIG. 11.

When assembling the wiper device 90, the fitting portion 110B formed by the metallic fitting portion forming portion 116 is inserted through the receiving portion 26 of the frame pipe 16. In this condition, where it is inserted, portions of the receiving portion 26 that face the plurality of close contact recesses 122 are swaged by a swaging tool and the like, so that the receiving portion 26 of the frame pipe 16 is plastic deformed at several positions to have a plurality of protrusions 66 formed there as shown in FIG. 12. By fitting the plurality of protrusions 66 tightly to the surface of the plurality of close contact recesses 122, the pivot holder 18 and the frame pipe 16 are coupled to each other by swaging and fixing as shown in FIG. 11.

The third embodiment has the following advantages.

(11) Similar to the first embodiment, the pivot holder 18 of the third embodiment is also configured to be coupled to the frame pipe 16 by swaging. Therefore, the costs can be reduced.

(12) The pivot holder 18 is configured as an integral component obtained by forming the metal component 98 integrally with the plastic part 32, which has a smaller specific gravity than the metal component 98. Therefore, the pivot holder 18 can be made light.

(13) In the pivot holder 18, the entirety of the fitting portion 110B, which includes the outer circumferential portion and the inner circumferential portion of the fitting portion 110B, is formed by the fitting portion forming portion 116 of the metal component 98. The receiving portion 26 of the frame pipe 16 is fixed to the outer circumferential portion of the fitting portion 110B by swaging. Therefore, the strength can be ensured of coupling/fixing of the pivot holder 18 to the frame pipe 16.

Further, the fitting portion 110B is formed by the metal component 98, which is a die-cast component made of metal such as aluminum alloy. Therefore, it is possible also to fix the receiving portion 26 of the frame pipe 16 to the fitting portion 110B of the pivot holder 18 by swaging by utilizing the same swaging tool as that used in such a conventional case that, for example, the entirety of the pivot holder may be a die-cast component made of metal such as aluminum alloy.

(14) The annular portion 112, the attachment portion forming portion 118, and the fitting portion forming portion 116 are formed by the one metal component 98. Therefore, even if the metal component 98 is influenced by a pressure and the like from the plastic material when, for example, the pivot holder 18 is being molded, it is easy to keep constant the extension direction and the posture of the fitting portion 110B and the vehicle body attachment leg 108 with respect to the pivot shaft 12. That is, it is easy to inhibit displacement in extension direction and posture of the fitting portion 110B and the vehicle body attachment leg 108 with respect to the pivot shaft 12. It is, therefore, easy to inhibit synergistic fluctuations from occurring in position at which the wiper device 90 is mounted to the vehicle body.

(15) The vehicle body attachment portion 108B formed on the distal end of the vehicle body attachment leg 108 is configured to be positioned between the holder tube portion 104 and the fitting portion 110B. In other words, the holder tube portion 104 is positioned on the opposite side of the fitting portion 110B with respect to the vehicle body attachment leg 108. Accordingly, if, for example, axial force of impact acts on the holder tube portion 104 via the pivot shaft 12, the vehicle body attachment leg 108 attached to the vehicle body serves as a supporting point of the force, so that only the holder tube portion 104 is broken and drops off. Therefore, in contrast to a case where, for example, the frame pipe 16 and the device coupled to it, for example, the wiper motor and the like drop off along with the holder tube portion, it is possible in the present embodiment to inhibit the movement stroke of the holder tube portion 104 at the time of drop off from being blocked. That is, it is possible to ensure the movement stroke of the holder tube portion 104 sufficiently at the time of occurrence of the force of impact.

The above embodiments may be changed as follows.

The vehicle body attachment portion 38B of the first embodiment shown in FIG. 3 is formed by the plastic part 32. Alternatively, the second metal component may form also the vehicle body attachment portion 38B. For example, the second metal component 30 may be formed to extend more to form a portion of the second metal component 30 that is exposed from the plastic part 32 as the attachment leg forming portion.

In contrast to the second embodiment shown in FIG. 7, in which the vehicle body attachment portion 38B is formed by the plastic part 32, the vehicle body attachment portion 38B may also be formed by the second metal component. For example, the second metal component 30 may be formed to extend more to provide a portion of the second metal component that is exposed from the plastic part 32 as the attachment leg forming portion.

Figure 13:
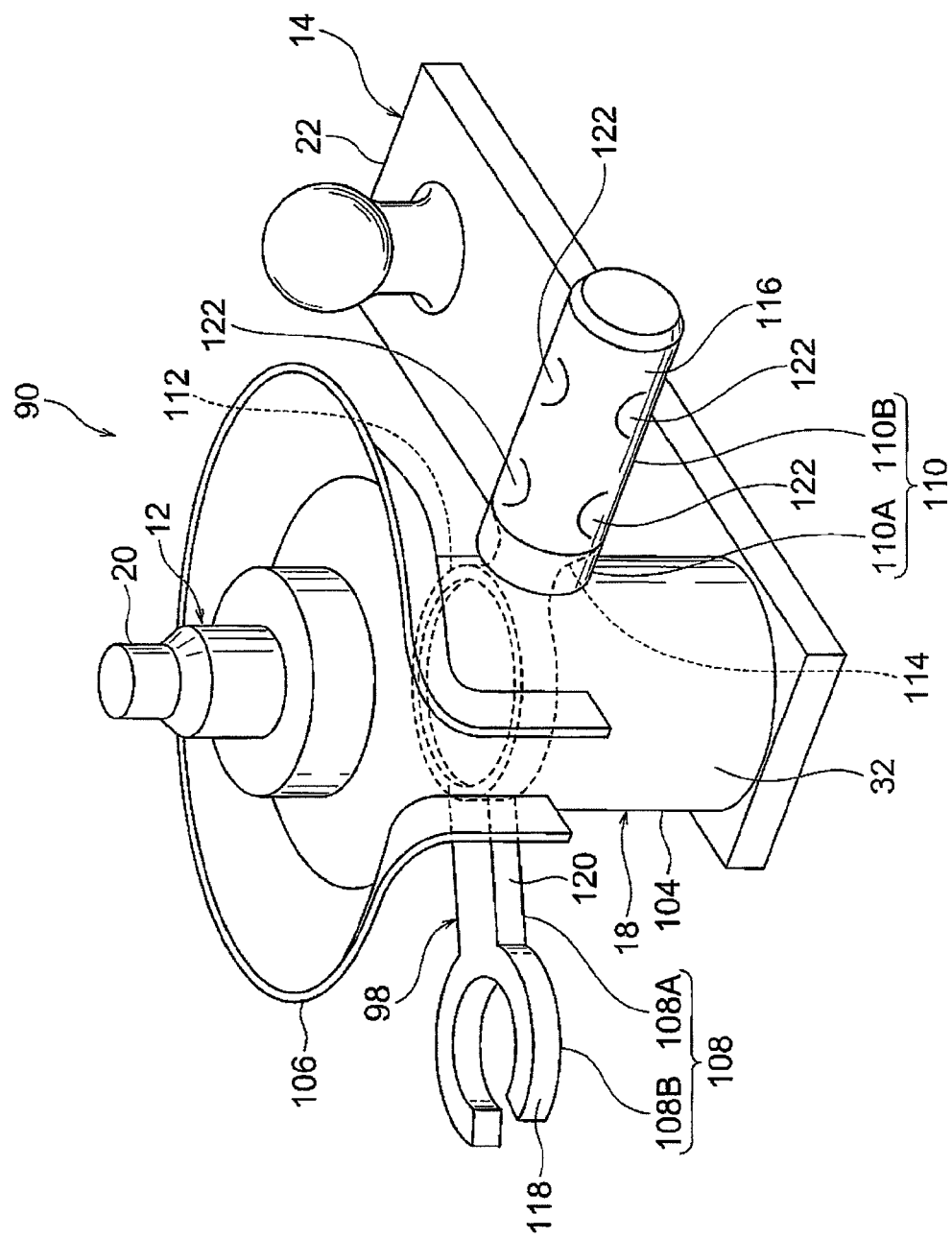
FIG. 13 is a perspective view of a modification of the third embodiment of the present invention.

As shown in FIG. 13, the position of the vehicle body attachment leg 108 of the third embodiment may be changed to the opposite side of the fitting portion 110B with respect to the holder tube portion 104. That is, the vehicle body attachment leg 108 is not always formed to be positioned between the holder tube portion 104 and the fitting portion 110B.

The entirety of the vehicle body attachment leg 108 may be made of metal as shown in FIG. 13. That is, the entirety of the vehicle body attachment leg 108 may be formed by the attachment portion forming portion 118 and the leg framework portion 120, which are both made of metal. For example, the attachment portion forming portion 118 and the leg framework portion 120 of the metal component 98 are exposed from the plastic part 32.

Figure 14:
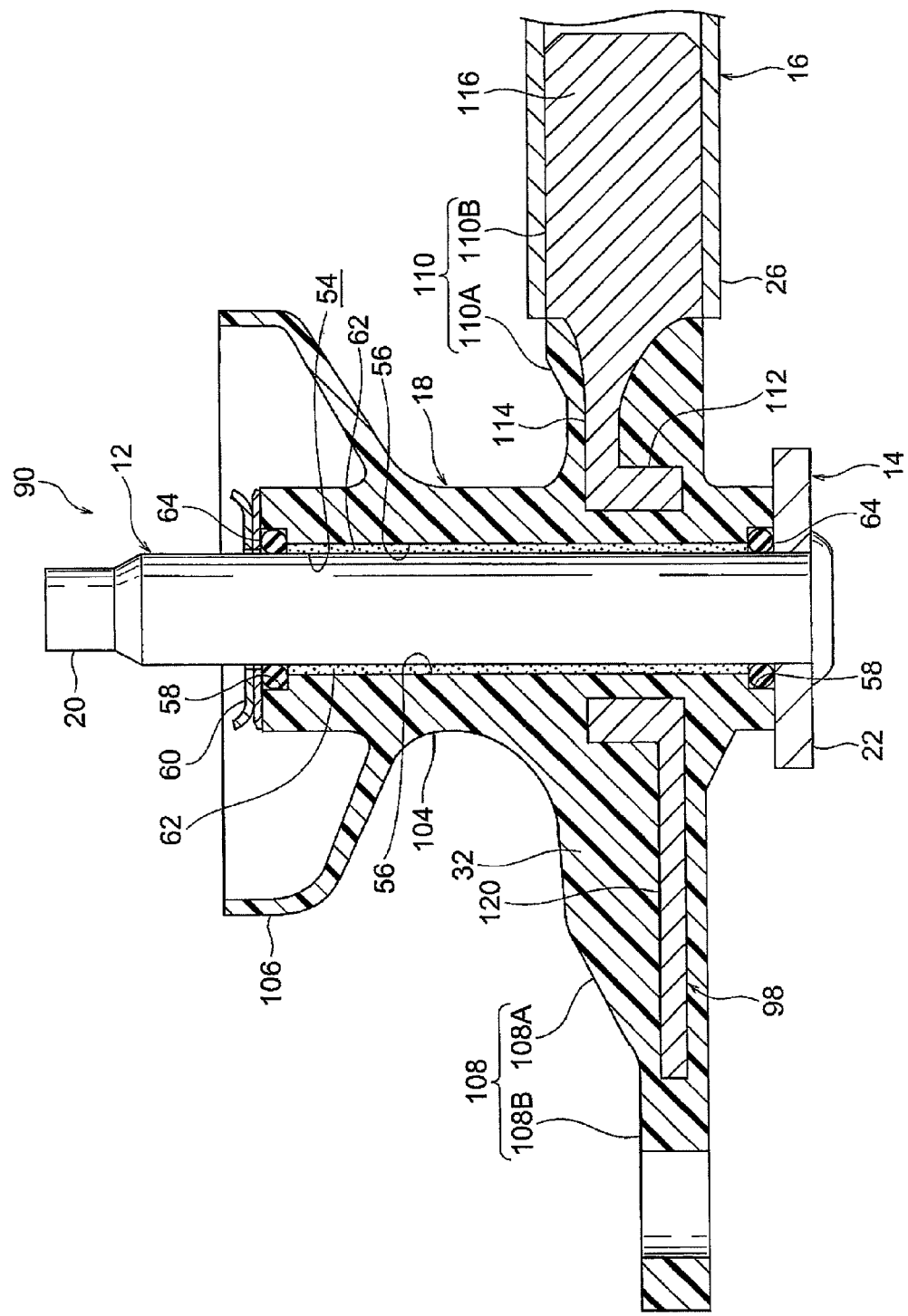
FIG. 14 is a front cross-sectional view of another modification of the third embodiment of the present invention.

As shown in FIG. 14, the metal component 98 may be deprived of the attachment portion forming portion 118 in configuration. For example, the metal component 98 has the leg framework portion 120 in such a manner that it may extend to the opposite side of the fitting portion forming portion 116 with respect to the annular portion 112. The vehicle body attachment portion 108B in FIG. 14 is formed by the plastic part 32.

The present invention is not limited to the above and various modifications may be made without departing from the spirit of the invention.

While the invention has been described in detail and with reference to specific embodiments thereof, it will be apparent to one skilled in the art that various changes and modifications can be made therein without departing from the spirit and scope thereof.

The invention claimed is:

1. A wiper device comprising:
   a metallic frame member that has a tubular receiving portion; and
   a pivot holder that is fixed to the frame member and holds a pivot shaft,
   wherein the pivot holder includes:
   a holder tube portion that rotationally supports the pivot shaft;
   a vehicle body attachment leg that extends radially outward from the holder tube portion and is attached to a vehicle body; and
   a fitting portion that is fitted and fixed to the receiving portion by swaging the receiving portion in a state where the fitting portion is inserted to an inside of the receiving portion,
   the pivot holder is provided as an integral component formed by a metal part and a plastic part, wherein the plastic part has a smaller specific gravity than the metal part and is integrally molded with the metal part, and
   the fitting portion is a solid core, and at least an outer circumferential portion of the fitting portion is formed by the metal part.

2. The wiper device according to claim 1, wherein the holder tube portion is formed by the plastic part.

3. The wiper device according to claim 1, wherein the metal part includes:
   a first annular portion, through which the pivot shaft is inserted, the first annular portion being embedded in the plastic part at the holder tube portion; and
   an outer circumferential portion forming portion, which extends from the first annular portion to form the outer circumferential portion of the fitting portion.

4. The wiper device according to claim 3, wherein an inner circumferential portion of the fitting portion is formed as a solid core, which is integrated with the outer circumferential portion by using the metal part.

5. The wiper device according to claim 3, wherein the metal part includes:
   a second annular portion, through which the pivot shaft is inserted, the second annular portion being embedded in the plastic part at the holder tube portion; and
   an attachment leg forming portion, which extends from the second annular portion to form at least a part of the vehicle body attachment leg.

6. The wiper device according to claim 5, wherein
   the first annular portion and the second annular portion are separate from each other, and
   the metal part includes:
   a first metal component, which has the first annular portion and the outer circumferential portion forming portion; and
   a second metal component, which has the second annular portion and the attachment leg forming portion.

7. The wiper device according to claim 5, wherein the first annular portion and the second annular portion are integral with each other.

8. The wiper device according to claim 7, wherein
   a part of the outer circumferential portion forming portion forms the attachment leg forming portion, and
   a distal end of the vehicle body attachment leg is configured to be positioned between the holder tube portion and the fitting portion.

9. The wiper device according to claim 5, wherein
   the vehicle body attachment leg includes:
   a leg body, which extends radially outward from the holder tube portion; and
   a vehicle body attachment portion, which is formed at the distal end of the leg body and attached to the vehicle body,
   the leg body is formed by the plastic part and the attachment leg forming portion, which is embedded in the plastic part to thereby form an internal framework of the leg body, and
   the vehicle body attachment portion is formed by the plastic part.

10. The wiper device according to claim 1, wherein
    the metal part has a hollow outer circumferential portion forming portion, which forms the outer circumferential portion of the fitting portion, and
    the plastic part has a support portion, which supports the outer circumferential portion forming portion from inside of the outer circumferential portion forming portion.

11. The wiper device according to claim 1, wherein the metal part includes:
    an annular portion, through which the pivot shaft is inserted, the annular portion being embedded in the plastic part at the holder tube portion; and
    an attachment leg forming portion, which extends from the annular portion to form at least a part of the vehicle body attachment leg.

12. A pivot holder having a holder tube portion rotationally supporting a pivot shaft,
    the pivot holder includes a coupling portion, which is inserted to the inside of a metallic frame pipe so that the pivot holder is coupled to the frame pipe, and the coupling portion has a close contact portion, wherein protrusions are formed on the frame pipe when the frame pipe is swaged, the protrusions come in close contact with the surface of the close contact portion, so that the coupling portion is coupled to the frame pipe, and
    the pivot holder is formed by a metal part, which forms the close contact portion, and a plastic part, which forms the holder tube portion and is formed integrally with the metal part,
    the coupling portion is a solid core, and at least an outer circumferential portion of the coupling portion is formed by the metal part.

* * * * *

UNITED STATES PATENT AND TRADEMARK OFFICE
CERTIFICATE OF CORRECTION

PATENT NO. : 8,689,390 B2  
APPLICATION NO. : 13/574182  
DATED : April 8, 2014  
INVENTOR(S) : Akihisa Motono et al.

Page 1 of 1

It is certified that error appears in the above-identified patent and that said Letters Patent is hereby corrected as shown below:

On the Title Page of the patent, item (75), under "Inventors:" the fourth and final inventor's name should read --Yoshiyuki Koumo--.

Signed and Sealed this  
Nineteenth Day of August, 2014

Michelle K. Lee  
*Deputy Director of the United States Patent and Trademark Office*